(12) United States Patent
Mazzer

(10) Patent No.: US 11,490,766 B2
(45) Date of Patent: Nov. 8, 2022

(54) COFFEE GRINDER-DOSER PROVIDED WITH MEANS OF PROTECTION OF THE WEIGHING DEVICE WITH RESPECT TO THE COFFEE POWDER

(71) Applicant: MAZZER LUIGI S.p.A., Venice (IT)

(72) Inventor: Giovanni Mazzer, Venice (IT)

(73) Assignee: MAZZER LUIGI S.P.A., Venice (IT)

( * ) Notice: Subject to any disclaimer, the term of this patent is extended or adjusted under 35 U.S.C. 154(b) by 0 days.

(21) Appl. No.: 16/479,267

(22) PCT Filed: Feb. 22, 2018

(86) PCT No.: PCT/IB2018/051111
§ 371 (c)(1),
(2) Date: Jul. 19, 2019

(87) PCT Pub. No.: WO2018/185569
PCT Pub. Date: Oct. 11, 2018

(65) Prior Publication Data
US 2020/0015629 A1 Jan. 16, 2020

(30) Foreign Application Priority Data
Apr. 7, 2017 (IT) .................. 102017000038863

(51) Int. Cl.
*A47J 42/40* (2006.01)
(52) U.S. Cl.
CPC .................................... *A47J 42/40* (2013.01)
(58) Field of Classification Search
None
See application file for complete search history.

(56) References Cited

U.S. PATENT DOCUMENTS

| 4,605,175 A | 8/1986 | Weber |
| 5,211,344 A | 5/1993 | In Albon |

(Continued)

FOREIGN PATENT DOCUMENTS

| CN | 102813468 A | 12/2012 |
| CN | 105615653 A | 6/2016 |

(Continued)

OTHER PUBLICATIONS

International Search Report for corresponding application PCT/IB2018/051111 filed Feb. 22, 2018; dated Apr. 16, 2018.

(Continued)

*Primary Examiner* — Jessica Cahill
*Assistant Examiner* — Mohammed S. Alawadi
(74) *Attorney, Agent, or Firm* — Cantor Colburn LLP

(57) ABSTRACT

Coffee grinder-doser including a grinder-doser body, a containment compartment which contains an electric motor and at least a coffee grinder operatively connected to the electric motor, configured to grind coffee beans into grounds, a conveyor of the ground coffee, a support for a container suitable to receive the ground coffee from an output of the conveyor, the support being mechanically connected to a weighing device by pulley means, the weighing device being placed inside hollow body, where the pulley means has a block which discharges the weight from the support to the weighing device, the block crossing a front opening of the hollow body, and where the grinder-doser includes means of protecting the ground coffee joined to the block in order to divert and/or increase the path of the ground coffee to enter the hollow body through the front opening.

11 Claims, 6 Drawing Sheets

(56) References Cited

U.S. PATENT DOCUMENTS

| | | | |
|---|---|---|---|
| 5,386,944 A * | 2/1995 | Knepler | G01G 19/52 |
| | | | 241/34 |
| 8,181,894 B2 | 5/2012 | Majer | |
| 8,272,586 B2 | 9/2012 | Bolognesi | |
| 10,240,969 B2 * | 3/2019 | Rego | G01G 23/005 |
| 10,595,671 B2 * | 3/2020 | Ottavi | A47J 31/3671 |
| 2005/0077403 A1 | 4/2005 | Yang | |
| 2010/0095852 A1 | 4/2010 | Remo | |
| 2010/0170971 A1 | 7/2010 | Doglioni Majer | |
| 2014/0203118 A1 * | 7/2014 | Rego | A47J 42/40 |
| | | | 241/6 |
| 2016/0120366 A1 | 5/2016 | Mazzer | |
| 2016/0143481 A1 | 5/2016 | Merelli | |
| 2016/0220067 A1 * | 8/2016 | Teahan | A47J 42/46 |
| 2016/0256001 A1 | 9/2016 | Lehotay | |
| 2016/0374513 A1 * | 12/2016 | Rego | A47J 31/42 |
| | | | 99/280 |
| 2017/0127884 A1 * | 5/2017 | Oddera | A47J 42/44 |
| 2018/0055288 A1 | 3/2018 | Rose | |
| 2018/0153349 A1 * | 6/2018 | Abbiati | A47J 31/404 |
| 2018/0279830 A1 * | 10/2018 | Conti | A47J 42/36 |

FOREIGN PATENT DOCUMENTS

| | | |
|---|---|---|
| CN | 106136912 A | 11/2016 |
| CN | 106175489 A | 12/2016 |
| EP | 1994866 A1 | 11/2008 |
| EP | 2286699 A1 | 2/2011 |
| EP | 3023041 A1 | 5/2016 |
| WO | 2012138327 A1 | 10/2012 |
| WO | 2014206944 A1 | 12/2014 |
| WO | 2015006244 A1 | 1/2015 |
| WO | WO-2015006244 A1 * | 1/2015 ............ A47J 31/42 |

OTHER PUBLICATIONS

International Search Report for corresponding application PCT/IB2018/051112 filed Feb. 22, 2018; dated Apr. 24, 2018.

Written Opinion of the International Searching Authority for corresponding application PCT/IB2018/051111 filed Feb. 22, 2018; dated Apr. 16, 2018.

Written Opinion of the International Searching Authority for corresponding application PCT/IB2018/051112 filed Feb. 22, 2018; dated Apr. 24, 2018.

Chinese Office Action for corresponding application 2018800103184; Report dated Oct. 19, 2021.

* cited by examiner

COFFEE GRINDER-DOSER PROVIDED WITH MEANS OF PROTECTION OF THE WEIGHING DEVICE WITH RESPECT TO THE COFFEE POWDER

FIELD OF APPLICATION

The present invention relates to a coffee grinder-doser with protection of the weighing device with respect to the coffee powder.

PRIOR ART

As is known, there are electric coffee grinders in which a casing or body containing an electric motor and a grinding chamber is identified, in which the grinding tools enclosed in said grinding chamber are started by the above motor.

Coffee grinders further comprise a container or conveyor of the coffee beans to be ground placed not below said grinding chamber in such a way as to convey said beans by gravity towards the grinding chamber.

The ground powder produced in the grinding chamber is then conveyed to a dispensing area.

For example, the dispensing area communicates with a device suitable for containing coffee powder, such as for example a filter contained into the relative filter holder, as better described hereinafter.

It should be noted that grinder-dosers are devices for dispensing a predetermined amount of coffee powder with an extremely reduced tolerance.

For example, the amounts of coffee powder to be dispensed (following instant grinding) are a few grams, typically 7, and must be observed with extreme precision.

For this reason, there are electric coffee grinders which are provided with weighing systems for the ground coffee powder, in which the amount of ground powder is determined by feedback systems linked to predetermined selected weight values.

Said systems act on the motor control to stop grinding and dispensing to obtain the desired weight value.

In other words, the system instantly weighs the amount of coffee powder obtained by moving the grinders and, upon reaching a preset value, it blocks the movement of the grinders and therefore the dispensing of coffee powder.

By way of example of the prior art, the following documents are cited, EP 2694216B1, WO 2015I06244A1, U.S. Pat. No. 5,386,944A.

The above dispensing zone may be shaped to collect the coffee in different containers, such as, for example, American coffee filters (U.S. Pat. No. 5,386,944 A), filer holders per espresso machine (EP 2694216B1) or portions for different preparations.

Normally, the container for ground coffee is positioned inferiorly to the grinding chamber, and the conveyor has the purpose of conveying the freshly ground coffee to said container.

In some known prior art solutions, the weighing system is internal (U.S. Pat. No. 386,944 A) to the machine body, while in others it is external (EP 2694216B1) to the body of the apparatus. In any case, there is the need to enclose said weighing elements in hollow bodies to protect the elastic element which determines the weighing from foreign elements (such as coffee powder) which could limit the movements of the elastic body (a classic example is that of load cell).

Regardless of the positioning of the elastic element that determines the weight measurement, whether it is inside the machine body or outside the machine body, if there is a return element from the elastic measurement element (placed inside a hollow body) to the support element of the coffee powder container, there is a need to provide a protection against the entry of foreign elements in said hollow body to prevent the elasticity of the elastic means and therefore the weight measurement from being disturbed.

In other words, if dirt and/or coffee powder were to infiltrate into the mechanisms of the weighing device, the weight itself would be affected and the system would not be able to guarantee the strict tolerances required by users.

In particular, it is necessary to prevent the powder from entering because, by using elastic means for reading the weight, it is necessary to leave a coupling clearance between the container, the weighing system and any fixed bodies present.

While the prior art solutions contemplate the use of a precision weighing device, they are not able to ensure dispensing accuracy over time precisely because of the infiltration of coffee powder and/or dirt. The only way to overcome this problem of the known solutions consists in the continuous cleaning of the parts intended for weighing: this cleaning, however, is not always easy as it requires the dismantling of parts of the machine and therefore, however frequent, is at best carried out only at the end of the day when the machine has already dispensed hundreds, if not thousands, of doses of coffee powder.

For this reason, the constant dispensing of the amount of coffee powder during the use of the machine is not guaranteed.

Moreover, the known solutions provide for a corrective and not preventive maintenance type: in other words, there are no devices suitable to prevent the infiltration of coffee powder, particularly greasy and tending to form sludge, in the weighing mechanisms, but cleaning and periodic maintenance for the removal of said powder.

DISCLOSURE OF THE INVENTION

The prior art solutions are therefore inconvenient and impractical; moreover, they do not ensure the supply of precise amounts of coffee powder in the area of use of the grinder-dosers, except as a result of special maintenance.

The need to solve the drawbacks and limitations mentioned with reference to the prior art is therefore felt.

Such a need is met by a grinder-doser according to claim 1.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
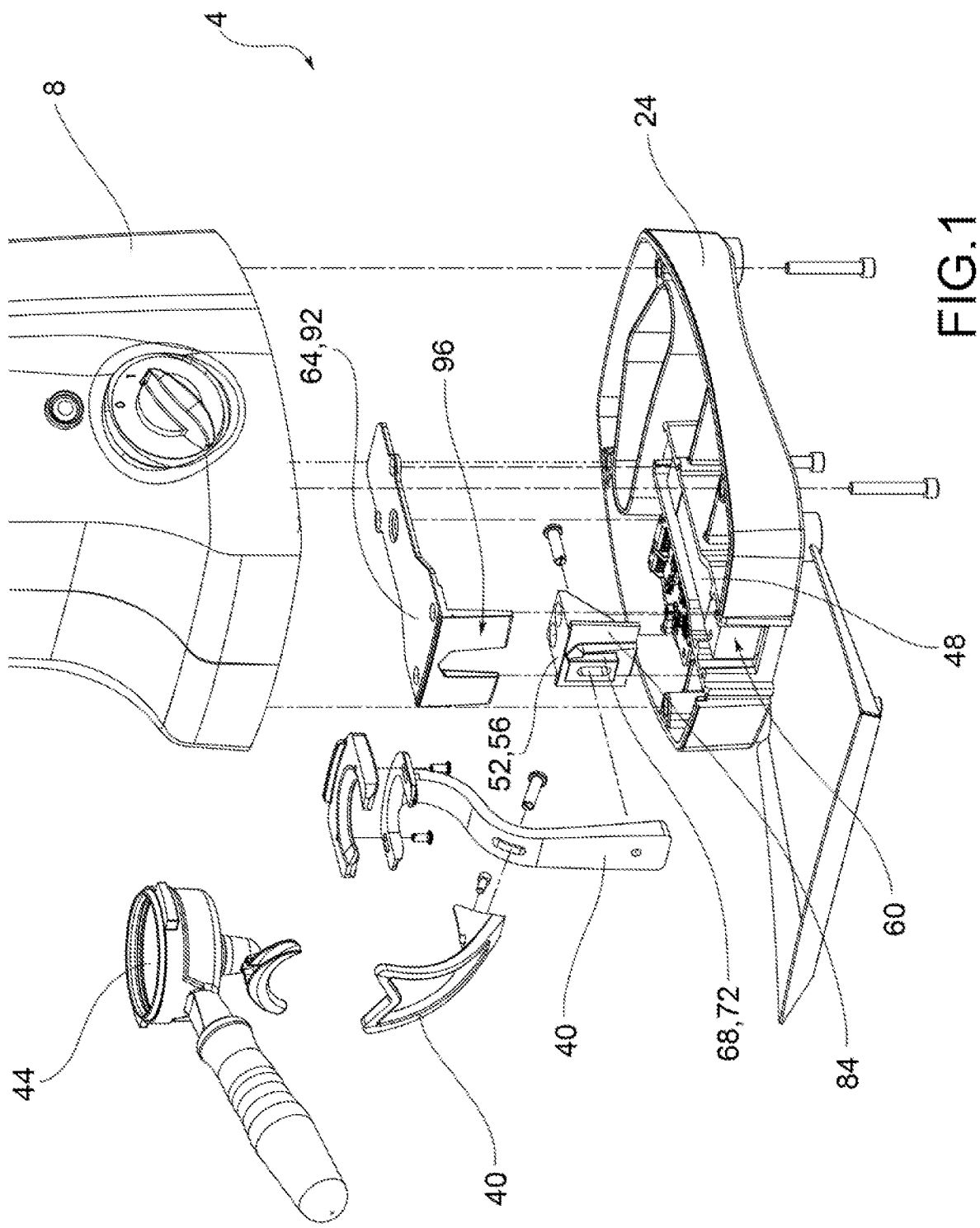
FIG. 1 shows a perspective view in separate parts of a coffee grinder-doser according to an embodiment of the present invention.

With reference to the above figures, reference numeral 4 globally indicates an overall schematic view of a grinder-doser according to the present invention.

The coffee grinder-doser 4 comprises a grinder-doser body 8 delimiting at least one containment compartment 12 which contains an electric motor 16 and at least a coffee grinder 20 operatively connected to said electric motor 16, and configured to grind coffee beans into grounds, in a known manner.

For the purposes of the present invention, the axis of orientation of the motor is irrelevant: therefore, it can be either horizontal or vertical.

The grinder-doser body 8 further comprises a base 24 and a bell 28 for containing coffee beans. The bell 28, in a known manner, conveys the coffee beans towards the at least one grinder 20 so as to obtain coffee in powder form.

Figure 2:
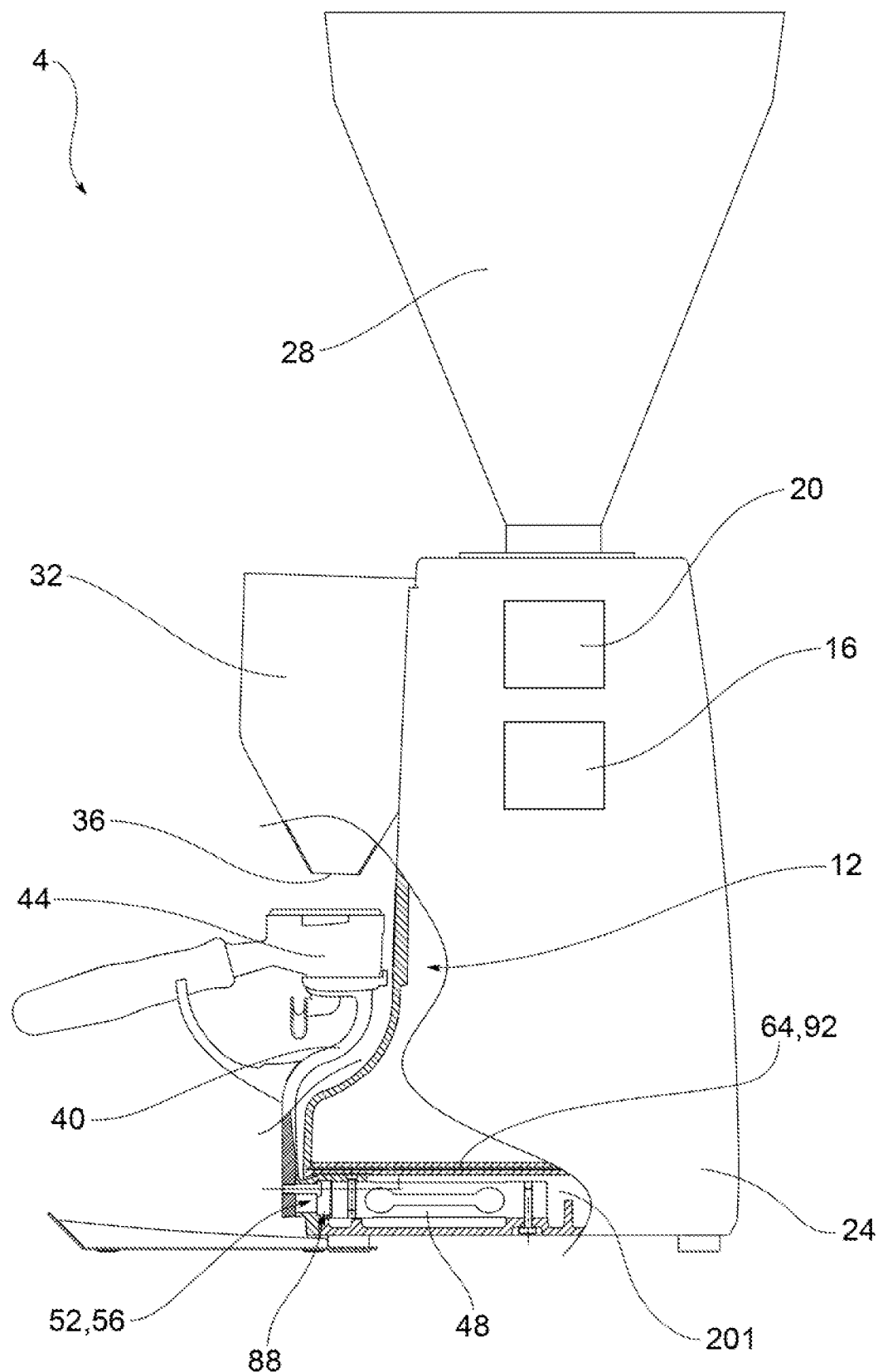
FIGS. 2-3 show lateral, partially sectional views of coffee grinder-dosers according to possible embodiments of the present invention.
Figure 3:
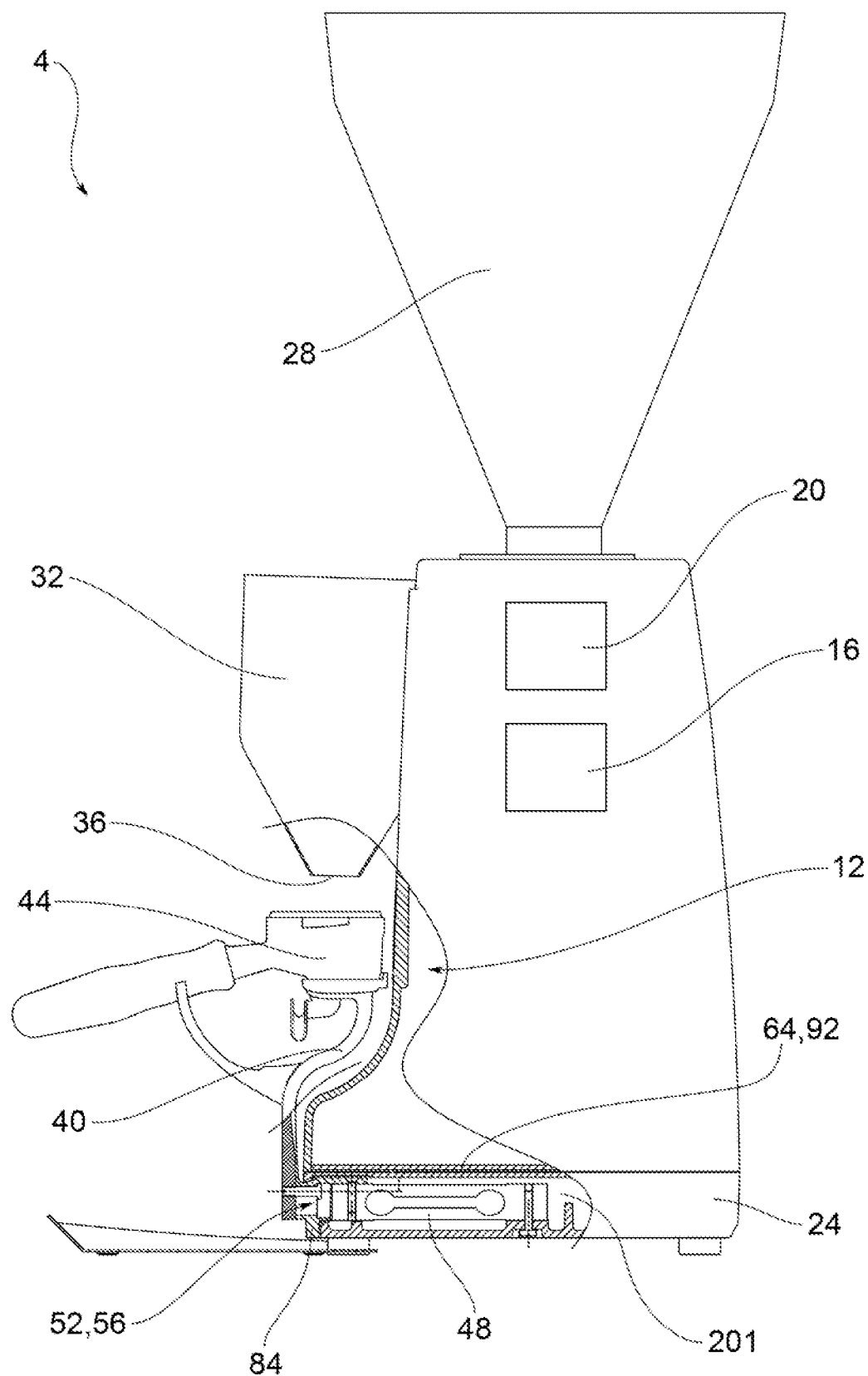

It should be noted that the base 24 may be integral (FIG. 2) with the grinder-doser body 8 or separated therefrom (FIG. 3); in this last configuration, the base will be mechanically associated with the grinder-doser body 8.

The grinder-doser body 8 comprises a conveyor 32 of said coffee powder, provided with an output 36, from which the coffee powder falls by gravity.

The grinder-doser 4 further comprises a support 40 for a container 44 adapted to receive the coffee powder from the output 36 of said conveyor 32. The container 44 is typically a filter holder provided with a relative filter for a coffee machine.

The support 40 is mechanically connected to a weighing device 48 by pulley means 52.

The weighing device 48 preferably comprises a load cell device.

The weighing device 48 is therefore capable of weighing the assembly comprising the support 40, the container 44 (optionally provided with a filter) and the pulley means 52, plus any coffee powder dispensed by the conveyor 32 and enclosed in the container 44. It is clear that the weighing device 48 must be extremely precise so as to detect the weight variation due to the fall of the coffee powder which contributes in an extremely reduced manner to the overall weight of the assembly of components listed above.

For example, the sensitivity of the weighing device 48 must be less than one gram, given that the amount of coffee to be dispensed into the container must be a few grams.

The weighing device 48 is arranged inside a hollow body 201, mechanically disjointed from (not shown) or joined to the grinder-doser 8. If joined, it can preferably be placed inside the base 24, whether it is integral or mechanically associated with the grinder-doser body 8. If mechanically disjointed, there will be communication means between the hollow body 201 and the grinder-doser body 8 in order to put the weighing system 48 into communication with the electric motor 16 to stop grinding at the appropriate time.

Advantageously, the pulley means 52 comprise a block 56 which discharges the weight from the support 40 to the weighing device 48, said block 56 crossing a front opening 60 of the hollow body 201.

Advantageously, the grinder-doser 4 comprises means of protecting 64 the ground coffee joined to the block 56 in order to divert and/or increase the path of the ground coffee to enter the hollow body 201 through the front opening 60.

In other words, said protection means 64 are used to divert from the front opening 60 any coffee powder fallen for example from the container 44 or to significantly increase the path that said powder should travel in order to enter through the same front opening 60.

According to an embodiment, the block 56 has a sloping portion 68, placed at the entrance to the front opening 60 and externally thereto, and comprising at least one layer 72 extending in order to convey the ground coffee into a position offset from the front opening 56 and not retain the coffee which would inevitably be counted as part of the coffee portioned into the container 44, thereby affecting the weighing accuracy.

According to an embodiment, said sloping portion 68 comprises a pair of layers 72 symmetrically arranged with respect to the front opening 60 and extended so as to convey the ground coffee into positions offset relative to the front opening 60.

Figure 6:
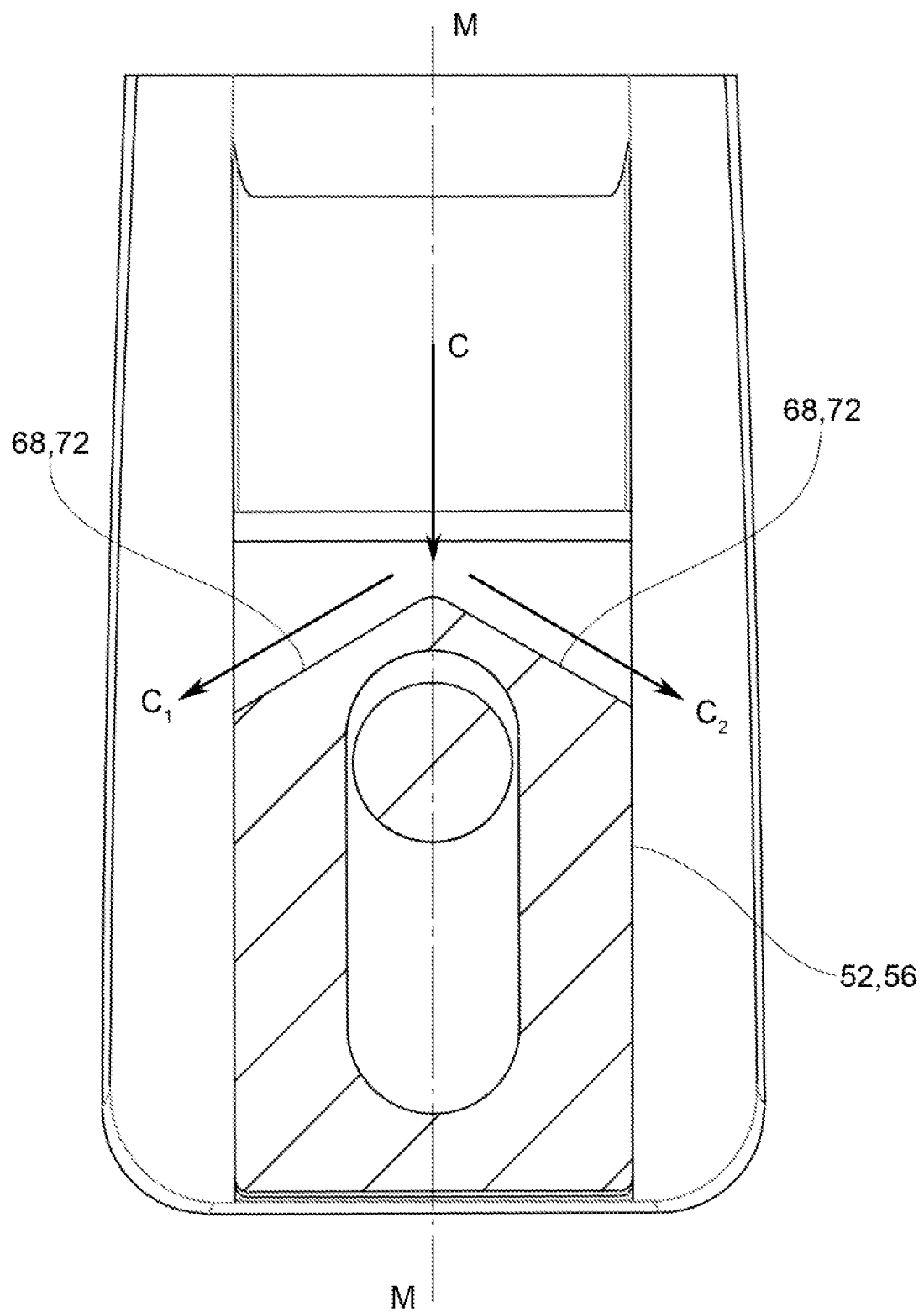
FIG. 6 shows a sectional view of the grinder-doser in FIG. 4, along the section plane VI-VI in FIG. 4.

A schematization of the technical effect of the layers 72 is given by arrows C, C1, C2 indicated in FIG. 6: the coffee powder falls perpendicularly according to arrow C, impacts on the sloping portion 68 and is divided thereby into two falling flows C1, C2.

Figure 4:
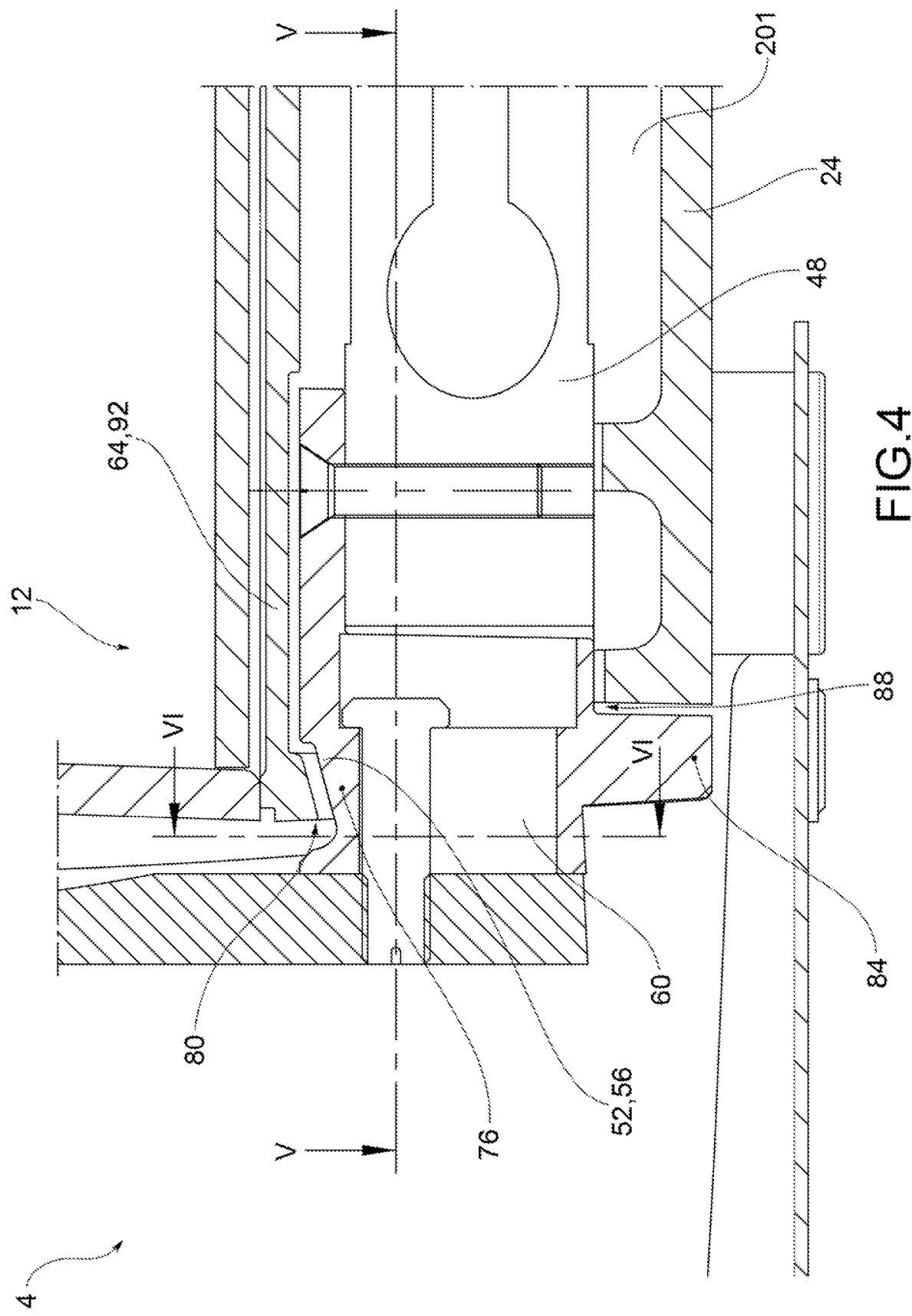
FIG. 4 shows a sectional view of a base of the grinder-doser in FIG. 1.

According to an embodiment (FIG. 4) the block 56 comprises a raised portion 76 with respect to an upper input edge 80 of the front opening 60, said raised portion 76 being contained inside the hollow body 201.

For example, said raised portion 76 comprises a ramp and/or a step.

In other words, any coffee powder that could slip just below the upper input edge 80 of the front opening 60 cannot continue inside the hollow body 201 because it is prevented by the presence of said raised portion 76, be it ramped and/or stepped.

According to an embodiment, the block 56 has a lower appendage 84 which extends below a lower input edge 88 of said front opening 60.

In this way, an additional barrier to the entry of the powder through the front opening 60 is obtained.

According to an embodiment, at the entrance of the block 56 through the front opening 60, the protection means 64 comprise an upper casing 92 that covers the block 56 at least near the front opening 60.

Preferably, said upper casing 92 comprises a fork portion 96 which engages on and embraces said block 56.

Preferably, the fork portion 96 engages on and covers the raised portion 76 of the block 56.

Of course, the upper casing 92 constitutes an additional barrier to the passage of the coffee powder inside the hollow body 201.

Figure 5:
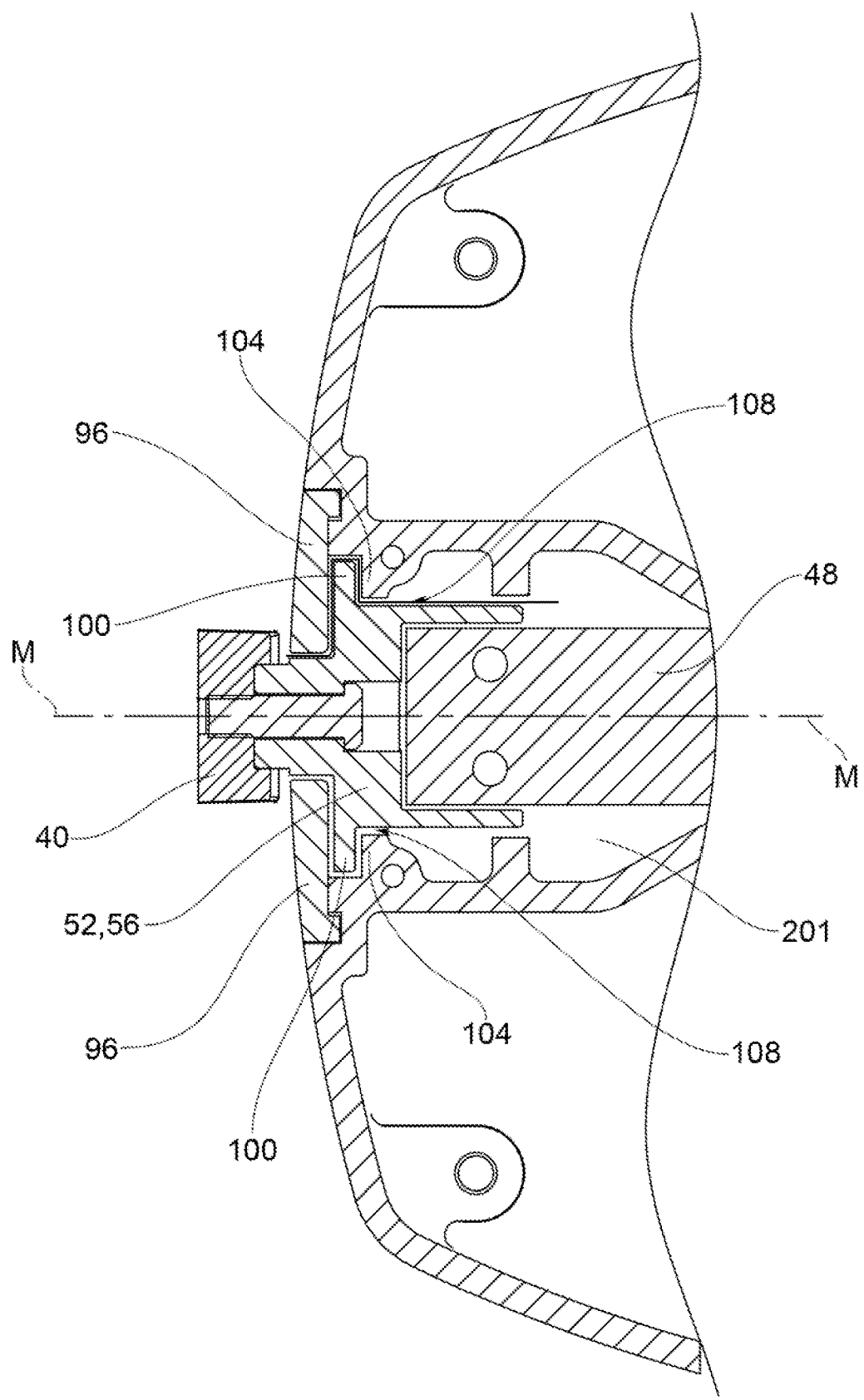
FIG. 5 shows a sectional view of the grinder-doser in FIG. 4, along the section plane V-V in FIG. 4.

According to a possible embodiment, the block 56 has an undercut portion 100 curving inwards towards a centreline M-M of said block 56, with respect to a cross-section plane perpendicular to said centreline plane M-M (FIGS. 5-6).

Said undercut portion 100 is coupled, according to a shaped coupling, with an abutment 104 made inside the hollow body 201.

The shape coupling between the undercut portion 100 and the abutment 104 identifies a labyrinth cavity 108 which forms an additional barrier to the passage of coffee powder inside the hollow body 201.

As can be appreciated from the description, the grinder-doser according to the present invention allows overcoming the drawbacks of the prior art.

In particular, the invention provides a plurality of devices which prevent the coffee powder from penetrating between the moving parts of the pulley means which connect the container support to the weighing device.

This ensures the correct operation of the weighing device, since the coffee powder is not able to prevent or in any case limit the travel of the movable parts of the weighing device itself, which therefore can always provide a correct and precise indication of the amount of coffee powder dispensed. Furthermore, the device is configured not to retain portions of coffee which would be erroneously counted by the weighing device and which are instead guided by gravity to fall in order not to affect the portioning of the amount of ground collected in the appropriate container.

It is therefore possible to significantly delay the scheduled maintenance/cleaning intervals of the coffee grinder without incurring in wrong measurements of the weight of the coffee powder.

Therefore, the system is able to dispense the amount of coffee set by the operator.

A man skilled in the art may make several changes and adjustments to the grinder-dosers described above in order to meet specific and incidental needs, all falling within the scope of protection defined in the following claims.

The invention claimed is:

1. A coffee grinder-doser comprising:
   a grinder-doser body,
   a containment compartment which contains an electric motor and a coffee grinder operatively connected to said electric motor, configured to grind coffee beans into grounds,
   a conveyor of said ground coffee,
   a support for a container suitable to receive the ground coffee from an output of said conveyor, the support being mechanically connected to a weighing device by a pulley, the weighing device being placed inside a hollow body of a base, the grinder-doser body affixed to the base,
   wherein the pulley comprises a block which discharges the weight from the support to the weighing device, said block crossing a front opening of the hollow body of the base, and
   the grinder-doser further comprising means of protecting joined to the block in order to divert the ground coffee from the front opening and/or to increase a path of the ground coffee to enter the hollow body through the front opening,
   wherein the means of protecting comprise a sloping portion disposed on the block having a pair of layers symmetrically arranged with respect to the front opening and configured to convey the ground coffee into a position offset relative to the front opening; and
   wherein the means of protecting further comprises an upper casing having a horizontal portion which extends over the weighing device and the block, and a fork portion which extends perpendicularly downward from the horizontal portion to engage upon and cover a raised portion of the block, wherein the upper casing constitutes a barrier to passage of ground coffee inside the hollow body.

2. The coffee grinder-doser according to claim 1, wherein the raised portion is disposed with respect to an upper input edge of the front opening, said raised portion being contained inside the hollow body.

3. The coffee grinder-doser according to claim 2, wherein said raised portion comprises a ramp and/or a step.

4. The coffee grinder-doser according to claim 1, wherein, at an entrance of the block through the front opening, the means of protecting comprise the upper casing that covers the block at least near the front opening.

5. The coffee grinder-doser according to claim 4, wherein said fork portion engages on and embraces said block.

6. The coffee grinder-doser according to claim 5, wherein the raised portion is disposed with respect to an upper input edge of the front opening, said raised portion being contained inside the hollow body.

7. The coffee grinder-doser according to claim 6, wherein said raised portion comprises a ramp and/or a step.

8. The coffee grinder-doser according to claim 1, wherein the block has an undercut portion curving inwards towards a centerline of said block, with respect to a cross-section plane perpendicular to said centerline plane.

9. The coffee grinder-doser according to claim 8, wherein said undercut portion is coupled with an abutment made inside the hollow body.

10. The coffee grinder-doser according to claim 1, wherein the block has a lower appendage which extends below a lower input edge of said front opening.

11. The coffee grinder-doser according to claim 1, wherein the weighing device is a load cell device.

* * * * *